United States Patent
Tueshaus et al.

(10) Patent No.: US 12,110,971 B2
(45) Date of Patent: Oct. 8, 2024

(54) SINGLE LEVER CARTRIDGE FOR A SANITARY FAUCET

(71) Applicant: Grohe AG, Hemer (DE)

(72) Inventors: Jan Philipp Tueshaus, Hemer (DE); Stefan Steinhoff, Sundern (DE); Martin Weiss, Schwerte (DE); Markus Leutner, Balve (DE)

(73) Assignee: GROHE AG, Hemer (DE)

( * ) Notice: Subject to any disclaimer, the term of this patent is extended or adjusted under 35 U.S.C. 154(b) by 0 days.

(21) Appl. No.: 17/610,003

(22) PCT Filed: Mar. 26, 2020

(86) PCT No.: PCT/EP2020/058536
§ 371 (c)(1),
(2) Date: Nov. 9, 2021

(87) PCT Pub. No.: WO2020/229039
PCT Pub. Date: Nov. 19, 2020

(65) Prior Publication Data
US 2022/0196165 A1 Jun. 23, 2022

(30) Foreign Application Priority Data
May 10, 2019 (DE) ...................... 10 2019 003 301.9

(51) Int. Cl.
*F16K 11/078* (2006.01)
*F16K 47/02* (2006.01)
(Continued)

(52) U.S. Cl.
CPC .......... *F16K 11/0787* (2013.01); *F16K 47/02* (2013.01); *F16K 47/04* (2013.01); *F16K 19/006* (2013.01); *F16K 47/026* (2013.01)

(58) Field of Classification Search
CPC .... F16K 11/0787; F16K 47/02; F16K 19/006; F16K 47/026; F16K 47/04
See application file for complete search history.

(56) References Cited

U.S. PATENT DOCUMENTS 2,922,616 A * 1/1960 Budde ................. F16K 27/0263
137/550
3,965,936 A * 6/1976 Lyon ................... F16K 11/0787
137/625.4
(Continued)

FOREIGN PATENT DOCUMENTS

DE 79 13 221 8/1979
DE 37 09 228 7/1988
(Continued)

OTHER PUBLICATIONS

International Search Report issued Jun. 18, 2020, in International (PCT) Application No. PCT/EP2020/058536, with English translation.

*Primary Examiner* — Craig M Schneider
*Assistant Examiner* — Christopher D Ballman
(74) *Attorney, Agent, or Firm* — Wenderoth, Lind & Ponack, L.L.P.

(57) ABSTRACT

A single-lever cartridge for adjusting mixed water by a swivel lever, having a control disk arrangement, which has a stationary control disk in a stationary position in the cartridge, in which a cold-water inlet and a hot-water inlet and a mixed-water outlet are formed, and a dynamic control disk displaceable by the swivel lever, in which a recess is formed, which is disposed in different overlaps with the cold-water inlets and hot-water inlets and the mixed-water outlet to adjust the mixed water fed from the mixed-water outlet of the stationary control disk, wherein the two control disks are in sliding contact with sealing surfaces facing each other at a sealing plane, and wherein the mouths of the (Continued)

cold-water inlets and hot-water inlets are formed in the sealing surface of the stationary control disk, which mouths can be covered by the sealing surface of the dynamic control disk.

9 Claims, 4 Drawing Sheets

(51) Int. Cl.
  *F16K 47/04* (2006.01)
  *F16K 11/00* (2006.01)

(56) References Cited

U.S. PATENT DOCUMENTS

| | | | | | |
|---|---|---|---|---|---|
| 4,088,153 | A | * | 5/1978 | Paasikivi | F16K 11/0787 137/625.4 |
| 4,301,836 | A | * | 11/1981 | Hunziker | F16K 11/0787 251/118 |
| 4,327,771 | A | | 5/1982 | Nikolayczik | |
| 4,540,023 | A | * | 9/1985 | Pawelzik | F16K 11/0787 137/625.17 |
| 4,765,368 | A | * | 8/1988 | Mutti | F16K 47/026 137/550 |
| 4,854,347 | A | * | 8/1989 | Knapp | F16K 47/026 251/127 |
| 4,921,016 | A | * | 5/1990 | Gnauert | F16K 27/045 137/625.4 |
| 4,971,113 | A | * | 11/1990 | Pawelzik | F16K 11/0787 137/454.2 |
| 4,997,005 | A | * | 3/1991 | Pawelzik | F16K 11/0787 137/625.4 |
| 5,080,134 | A | * | 1/1992 | Orlandi | F16K 11/0787 137/625.4 |
| 5,095,934 | A | * | 3/1992 | Iqbal | F16K 27/045 137/636.2 |
| 5,269,342 | A | * | 12/1993 | Portis | F16L 55/1152 137/849 |
| 5,303,736 | A | * | 4/1994 | Orlandi | F16K 47/026 251/127 |
| 5,329,958 | A | * | 7/1994 | Bosio | F16K 11/078 251/355 |
| 5,372,161 | A | * | 12/1994 | Bechte | F16K 3/08 251/368 |
| 5,417,242 | A | * | 5/1995 | Goncze | F16K 11/0787 137/625.4 |
| 5,755,261 | A | * | 5/1998 | Fukuzawa | F16K 25/005 251/355 |
| 5,839,464 | A | * | 11/1998 | O'Hara | F16K 27/045 137/217 |
| 5,857,489 | A | * | 1/1999 | Chang | F16K 11/0787 137/625.4 |
| 5,896,601 | A | * | 4/1999 | Humpert | F16K 11/0787 4/677 |
| 5,983,939 | A | * | 11/1999 | Heimann | F16K 31/605 137/382 |
| 6,019,132 | A | * | 2/2000 | Knapp | F16K 11/0787 251/174 |
| 6,209,581 | B1 | * | 4/2001 | Gyozo | F16K 11/0782 251/235 |
| 6,920,899 | B2 | * | 7/2005 | Haenlein | F16K 11/0746 137/636.3 |
| 7,044,162 | B2 | * | 5/2006 | Bolgar | F16K 11/078 137/625.4 |
| 7,137,410 | B2 | * | 11/2006 | Rosko | F16K 35/02 251/285 |
| 8,327,882 | B2 | * | 12/2012 | Li | F16K 11/0787 137/625.4 |
| 8,578,966 | B2 | * | 11/2013 | Thomas | F16K 11/0787 251/284 |
| 8,978,700 | B2 | * | 3/2015 | Frackowiak | F16K 11/0787 137/625.4 |
| 9,267,612 | B2 | * | 2/2016 | Chen | F16K 27/045 |
| 9,297,463 | B2 | * | 3/2016 | Asboth | F16K 11/078 |
| 11,028,930 | B2 | * | 6/2021 | Cattaneo | F16K 47/026 |
| 2020/0149641 | A1 | * | 5/2020 | Gili Martínez | F16K 11/0787 |
| 2021/0190231 | A1 | | 6/2021 | Bian | |

FOREIGN PATENT DOCUMENTS

| | | |
|---|---|---|
| DE | 10 2016 006 388 | 8/2017 |
| EP | 0 018 438 | 11/1980 |
| EP | 0 059 697 | 9/1982 |
| EP | 0 129 715 | 1/1985 |
| EP | 0 311 573 | 4/1989 |
| EP | 3 181 963 | 6/2017 |

\* cited by examiner

SINGLE LEVER CARTRIDGE FOR A SANITARY FAUCET

The invention relates to a single-lever cartridge for a sanitary faucet for adjusting the temperature and/or quantity of mixed water according to the preamble of claim 1.

The use of single-lever cartridges is widespread in the sanitary sector. When the swivel lever of such a single-lever cartridge is tilted, the quantity of mixed water is adjusted. Turning the swivel lever results in a change of the mixed-water temperature.

A generic single-lever cartridge having a control disk arrangement is known from EP 311 573 B1. It has a stationary control disk disposed in the cartridge, in which a cold-water inlet, a hot-water inlet and a mixed-water outlet are formed. In addition, the control disk arrangement has a dynamic control disk, which can be displaced by means of the swivel lever and in which a recess is formed, which can be brought into different overlaps with the cold-water inlets and hot-water inlets and the mixed-water outlet to adjust the temperature and/or the quantity of the mixed water routed from the mixed-water outlet of the stationary control disk. Sealing surfaces of the two control disks facing each other are in sliding contact at a sealing plane. The mouths of the cold-water inlets and hot-water inlets, which the sealing surface of the dynamic control disk can cover, are formed in the sealing surface of the stationary control disk.

When a cartridge designed for high flow (for instance, for a tub application) is used in a low flow faucet (for instance, a washbasin faucet with a PCA jet regulator), there is an issue in that the maximum flow is reached at a small opening angle of the cartridge. This renders adjusting the temperature and/or the amount of mixed water inconvenient. To render the adjustment of the temperature and/or the quantity of the mixed water more convenient, it is known to use a flow restrictor in the flow path downstream of the cartridge to massively throttle the mixed-water flow. In that case, however, the control disk assembly remains subjected to high water pressure.

As a result, even small pressure differences between hot and cold water can cause a cross flow. In addition, there is a risk that there may be a sharp change in the mixed-water temperature if the water pressure changes while the water is running.

The invention addresses the problem of providing a single-lever cartridge that can be used in a simple manner both for sanitary faucets having a low flow rate (for instance, washbasin faucets) and for sanitary faucets having a high flow rate (for instance, bathtub faucets), wherein in both cases a convenient adjustment of the temperature and/or quantity of the mixed water is achieved in comparison to the prior art.

The problem is solved by the features of claim 1. Preferred further embodiments of the invention are disclosed in the dependent claims.

According to the characterizing part of claim 1, the cartridge has a throttling element designed as a separate component, which can be used to reduce a flow cross-section of the mouths of the cold-water inlets and hot-water inlets. In this way, a throttling of the hot-water flow and/or cold-water flow occurs, which throttling is routed in the direction of the recess of the dynamic control disk.

According to the invention, the flow is thus no longer limited in the flow path downstream of the cartridge with the aid of a separate flow restrictor. Rather, according to the invention, the flow restriction is integrated directly at the inlet end of the cartridge. The control disk arrangement in the cartridge is therefore subjected to a lower water pressure (from the dynamic disk) compared to the prior art, which reduces the risk of cross flow and in that way also improves the adjustability of the temperature and/or quantity of the mixed water.

In contrast to the invention, in EP 311 573 B1 mentioned above, a screen element is inserted into the recess of the dynamic control disk. However, the screen element is not similar to the throttle element according to the invention in terms of installation position and function: For instance, the screen element is inserted in the recess of the dynamic control disk at a distance from the sealing plane. The screen element therefore does not reduce the flow cross-section at the mouths of the cold-water inlets and the hot-water inlets, but only has the effect of reducing noise in the flow path through the cartridge. The use of such screen elements is also known from EP 18438131 and DE 7913221 U1.

In one technical implementation, the throttle element may have a throttle bottom having throttle openings. The throttle bottom can be flush in the sealing plane at its bottom end facing the sealing surface of the stationary control disk, i.e. in sliding contact with the sealing surface of the stationary control disk.

For ease of assembly or disassembly, the throttle element may have the component geometry explained below: For instance, the throttle element can be cup-shaped overall, namely having the throttle bottom mentioned above and a shell raised therefrom, preferably circumferentially closed. The throttling element can preferably be manufactured as a plastic part.

The control disk assembly (i.e., control disk pack) may additionally include a slide plate secured at the dynamic control disk in the cartridge. A bearing position for an axle connection to the swivel lever can be formed at the slide plate. In such a structural design of the cartridge, the shell of the throttling element can merge into an outwardly angled retaining flange at its rim remote from the bottom. The retaining flange can easily be clamped between the dynamic control disk and the slide plate. To prevent the throttling element from lifting off at high water pressure, the throttling element can be secured by means of an additional spring element. The spring element can be an additional component or integrated into the slide plate or throttle element.

In the installed position, the preferably circumferential shell of the cup-shaped throttle element can be in gap-free contact with an inner wall of the dynamic control disk delimiting the recess.

The shell of the throttling element can also preferably be a closed surface to provide a proper throttling effect with corresponding pressure drop and with corresponding flow restriction.

In a preferred technical implementation, the throttle bottom of the cup-shaped throttle element can be divided into a first bottom segment and a second bottom segment. Throttle openings are formed in each of the two bottom segments. The bottom end of the first bottom segment facing the sealing surface of the stationary control disk is flush with the sealing plane to reduce the effective flow cross-section of the cold-water inlets and hot-water inlets. This means that the first bottom segment is in sliding contact with the sealing surface of the stationary control disk. In contrast, there is a clear space (clearance) between the second bottom segment and the sealing plane. The two bottom segments merge at a transition section having an S-shaped or stepped profile. With regard to an increased throttling effect, the transition section between the two bottom segments can be designed having a closed surface (i.e. without throttle openings).

The recess formed in the dynamic control disk forms a mixing chamber in conjunction with the mixed-water outlet in the stationary control disk. In the design above, the cup-shaped throttle element can divide this mixing chamber into the first sub-chamber formed in the dynamic control disk and a second sub-chamber formed in the stationary control disk. Therefore, when the water is running, the flow path is as follows: A cold-water flow and/or hot-water flow at the inlet end is first completely directed into the first sub-chamber and throttled at the first bottom segment (i.e., the first throttling point). The flow passes through the first sub-chamber, wherein the cold-water flow and/or hot-water flow at the throttle openings of the second bottom segment (i.e. second throttle point) flows out into the second sub-chamber, i.e. into the mixed-water outlet. Because of the clear height of the second bottom segment to the sealing plane, there is a deformation space between the throttle bottom and the sealing plane when the faucet is open. The second bottom segment, which is subjected to high flow pressure, can be slightly pressed or deformed in the direction of the sealing plane in the deformation space, in that way ensuring the stable positioning of the throttle element in the correct position, even at high water pressures.

In a further variant of the embodiment, a cleaning unit can be disposed in the first sub-chamber to prevent the throttle openings in the first and second bottom segments from becoming clogged by limescale. Preferably, the cleaning unit may have a baffle plate spaced apart from the throttle openings and loosely disposed in the first sub-chamber, from which cleaning pins project. The cleaning pins have a reduced diameter compared to the throttle orifice diameter, i.e. they are guided through the throttle orifices of the first and second bottom segments with hole clearance. When the water is running through the faucet, the flow pressure in the first sub-chamber causes the baffle plate to move in conjunction with four cleaning pins, preventing the orifices from becoming clogged by limescale, etc.

Exemplary embodiments of the invention are described below with reference to the attached figures.

Figure 3A:
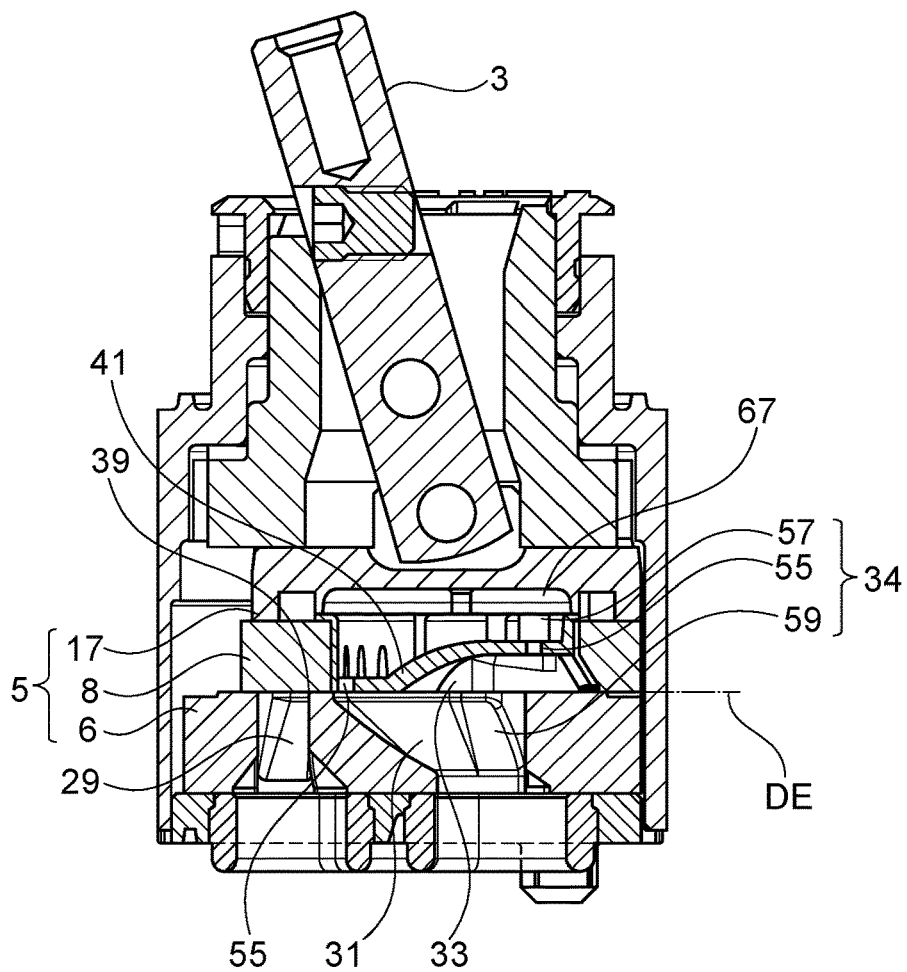
FIGS. 3a and 3b show different views of the single-lever cartridge for a closed position of the swivel lever.
Figure 3B:
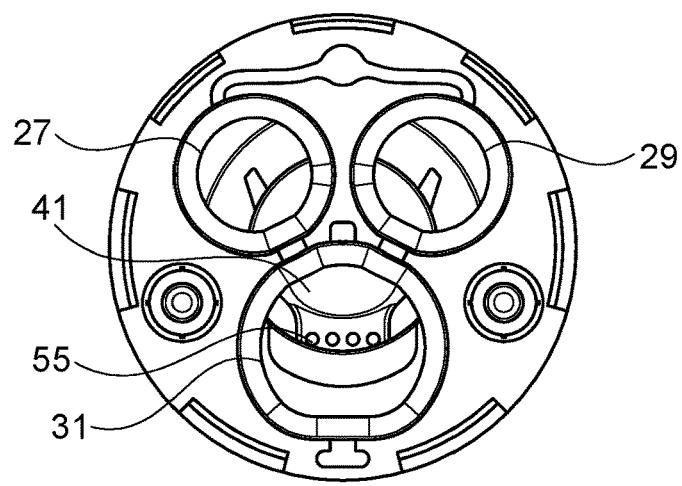
Figure 4A:
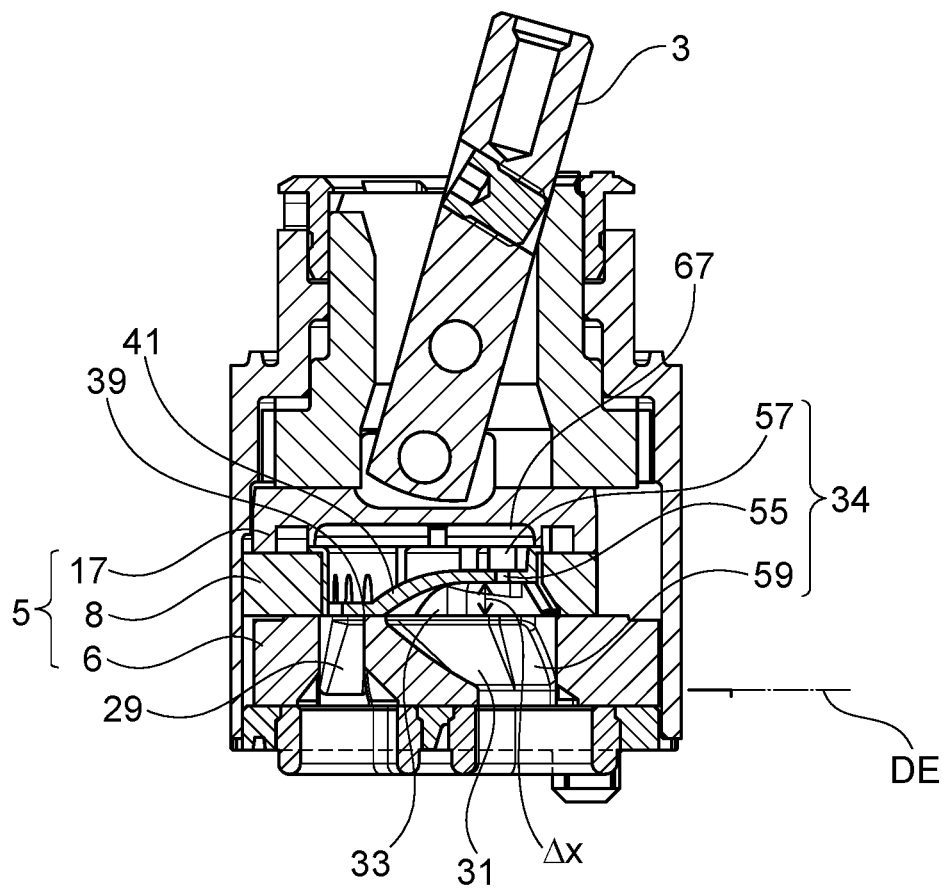
Figure 4B:
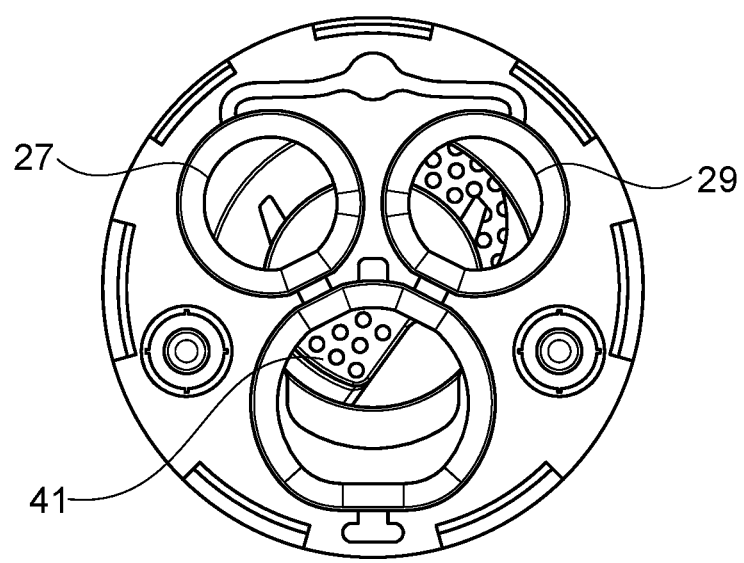
Figure 5:
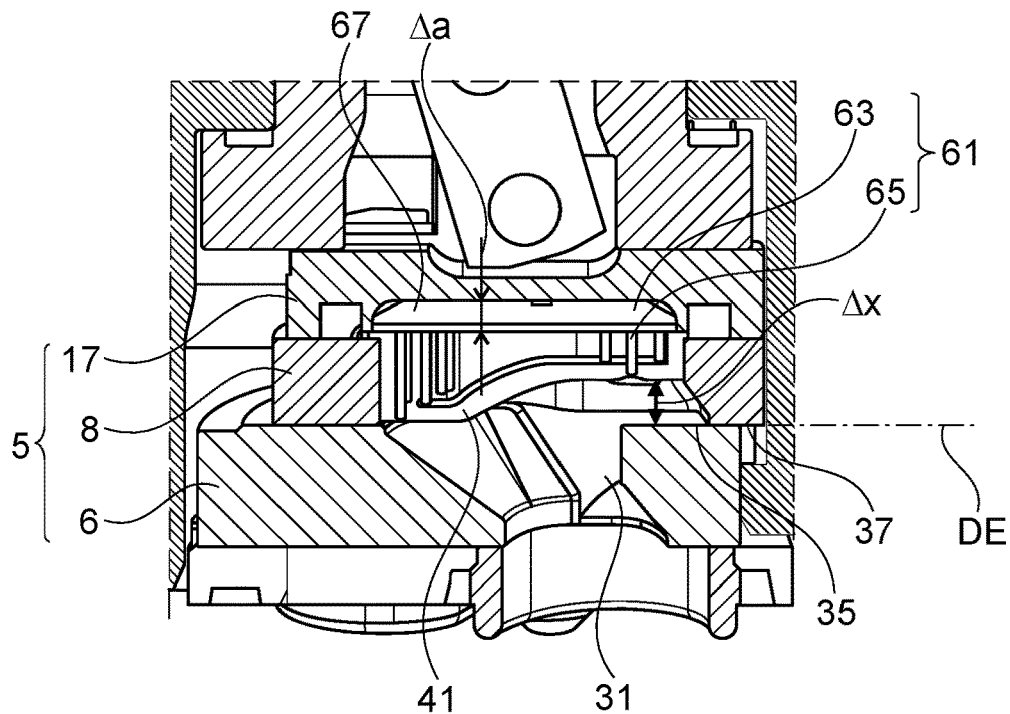
Figure 6:
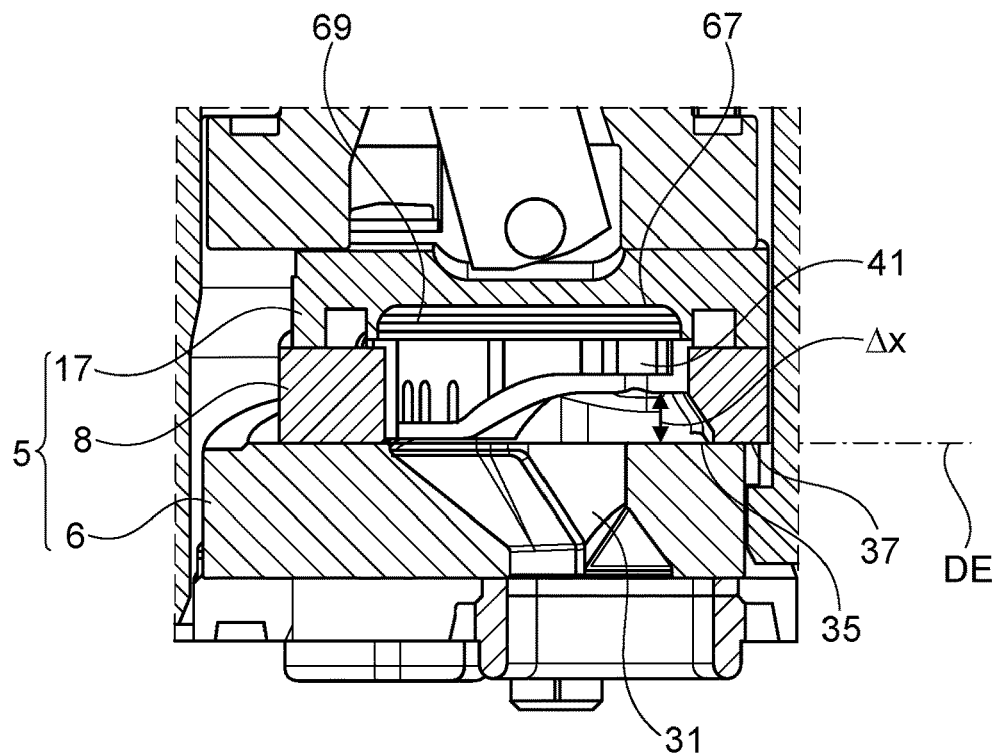

FIGS. 4a and 4b, respectively, show views corresponding to FIG. 3, wherein the single-lever cartridge is in an open position, in which a flow connection is established between one of the water inlets and the mixed-water outlet;

FIG. 5 shows a detailed view of a second exemplary embodiment of the single-lever cartridge; and FIG. 6 shows a view corresponding to FIG. 5, of a further exemplary embodiment of the single-lever cartridge.

Figure 1:
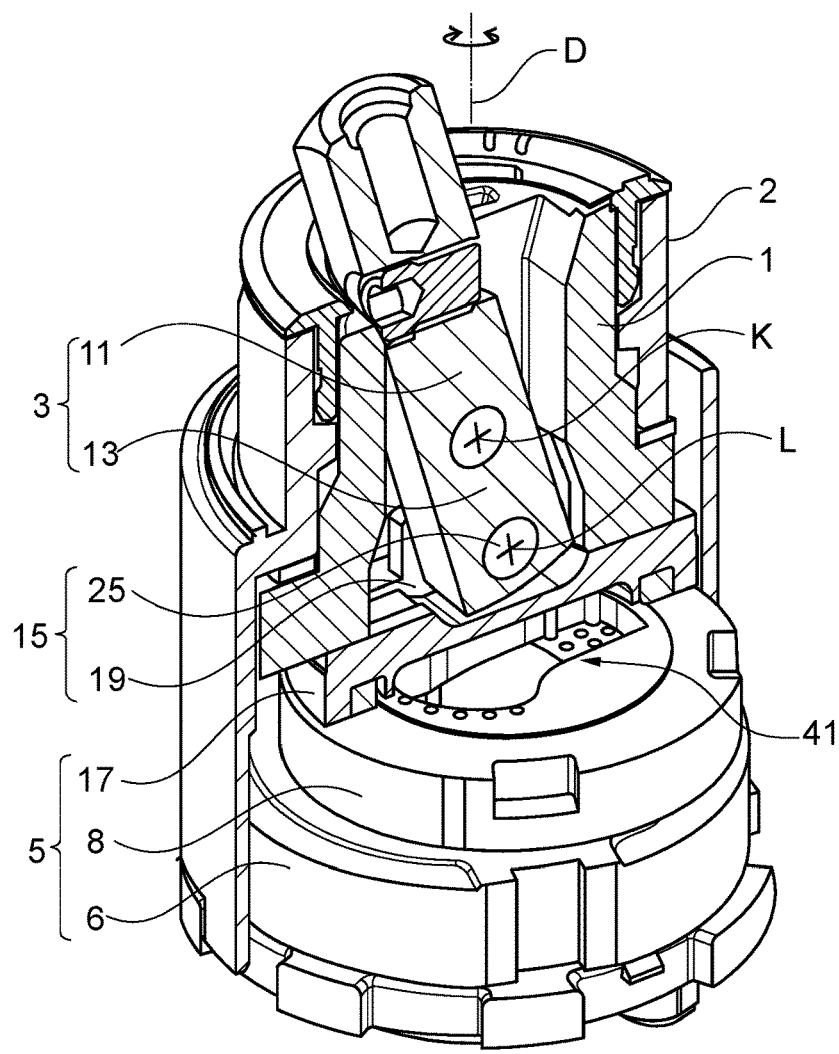
FIG. 1 shows a perspective partial section of a single-lever cartridge.

FIG. 1 shows a single-lever cartridge having a swivel sleeve 1 with a swivel lever 3 integrated therein and a control disk pack 5. In the assembled state shown in FIG. 1, the swivel sleeve 1 and the control disk pack 5 are mounted in a mainly rotationally symmetrical cartridge housing 2.

The cartridge housing 2 is again installed in a mounting position in a faucet housing of a sanitary faucet having a water outlet. As can be seen from FIG. 1, in the installed position in the cartridge housing 2, the swivel sleeve 1 can be rotated about an axis of rotation D through a rotation angle predetermined by rotation stops (not shown). The swivel lever 3 is articulated inside the swivel sleeve 1 to a tilting axis K. The tilting axis K divides the swivel lever 3 into a lever arm 11 projecting from the cartridge, which can be actuated by the user, and a lever arm 13, which is coupled to a slide plate 17 of the control disk pack 5 via an axis connection 15. In FIG. 1, the control disk pack 5 also has a stationary control disk 6 disposed in a stationary position in the cartridge housing 2 and a displaceable, dynamic control disk 8 lying on top thereof. The dynamic control disk 8, in conjunction with the slide plate 17, forms a form-fitting unit. A bearing position 19 is formed at the top of the slide plate 17 in FIG. 1. The axle connection 15 is formed, on the one hand, by the bearing position 19 and, on the other hand, by a transverse axle journal 25 defining the bearing axis L, which extends axially in parallel to the tilting axis K.

A hot-water inlet 27 and a cold-water inlet 29 (FIG. 3b) are located in the stationary control disk 6. In addition, a mixed-water outlet is provided in the stationary control disk 6, which mixed-water outlet can be connected to the water outlet of the sanitary faucet. The cold-water inlets and hot-water inlets 29, 27 of the stationary control disk 6 can be brought into different overlaps with a recess 33 formed in the dynamic control disk 8, depending on the rotational or swivel position of the swivel lever 3, whereby a temperature adjustment and/or quantity adjustment of the mixed water can be performed. The recess 33 of the dynamic control disk 8 and the mixed-water outlet 31 in the stationary control disk 6 form a mixing chamber 34 (FIG. 3a or 4a).

The single-lever cartridge shown in the figures is used to adjust the temperature of the mixed water via a rotary actuation of the swivel lever 3 about the axis of rotation D. For such a rotary actuation about the axis of rotation D, the swivel lever 3, the swivel sleeve 1 and the slide plate 17 in conjunction with the dynamic control disk 8 form a rotationally coupled unit. In contrast, the volume of the mixed water is adjusted by means of a tilting motion of the swivel lever 3 about the tilting axis K, during which the dynamic control disk 8 moves in a linear motion along the stationary control disk 6. By way of example, FIGS. 3a and 3b show the swivel lever 3 in its center-of-rotation position and in its closed position, in which there is no flow connection between the inlets 27, 29 and the mixed-water outlet 31. In contrast, in FIGS. 4a and 4b, the swivel lever is tilted about its tilting axis K and rotated about its rotational axis D by a rotational angle, resulting in a flow connection between the right inlet 29 shown in FIG. 4b and the mixed-water outlet 31.

As shown in FIGS. 3a and 4a, the two control disks 6, 8 are in sliding contact with facing sealing surfaces 35, 37 (shown only in FIGS. 5 and 6) at a sealing plane DE. The mouths 39 (shown only in FIGS. 3a and 4a) of the cold-water inlets and hot-water inlets 29, 27 are formed in the sealing surface 35 of the stationary control disk 6. Depending on the positioning of the dynamic control disk 8, these may be covered or exposed by the sealing surface 37 of the dynamic control disk 8.

As can be seen from the figures, the single-lever cartridge has a throttle element 41 designed as a separate component, which can be used to reduce the flow cross-section of the orifices 39 of the cold-water inlets and hot-water inlets 29, 27. The throttle element 41 can be used to reduce the hot-water flow and/or cold-water flow into the mixing chamber 34 at the inlet end in the single-lever cartridge in that way.

Figure 2:
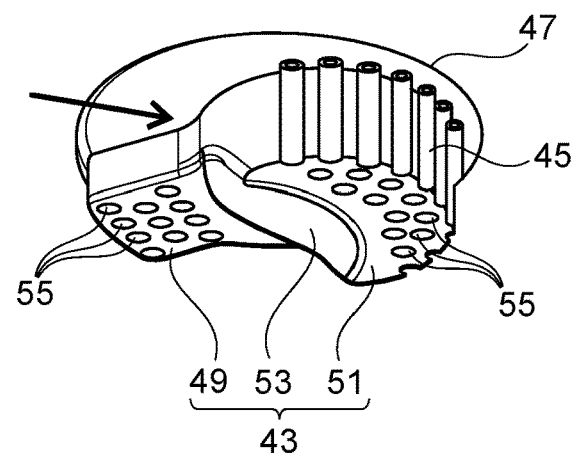
FIG. 2 shows the throttle element in island position.

The throttle element 41 is cup-shaped in the figures, according to FIG. 2 having a throttle bottom 43 and a circumferentially closed shell 45 rising therefrom. The shell 45 of the throttle element 41 is formed at its rim remote from the bottom with a retaining flange 47 angled outwards therefrom, which is clamped between the dynamic control disk 8 and the slide plate 17 in the installed position. In addition, the throttle bottom 43 of the throttle element 41 is divided into a first bottom segment 51 and a second bottom segment 49. The two bottom segments 49, 51 are each formed having throttle openings 55. In FIG. 3a or 4a, the bottom end of the first bottom segment 51 is positioned facing the sealing surface 35 of the stationary control disk 6 flush with the sealing plane DE and in sliding contact with the sealing surface 35 of the stationary control disk 6. In contrast, the second bottom segment 49 is spaced apart from the sealing plane DE by a clearance Δx (FIG. 4a, 5 or 6) forming a deformation space 53 and is out of sliding contact with the sealing surface 35 of the stationary control disk 6.

As mentioned above, the two bottom segments 49, 51 of the throttle bottom 43 are formed having throttle openings 55, whereas the circumferential shell 45 and an S-shaped transition section 53 between the two bottom segments 49, 51 are formed having a closed surface, i.e. without throttle openings 55.

In the installed position shown in FIG. 3a or 4a, the throttle element 41 divides the mixing chamber 34 into an upper, inlet-end sub-chamber 57 and a lower, outlet-end sub-chamber 59. In that way, when the water is running, a cold-water flow and/or a hot-water flow at the inlet end initially enters the first sub-chamber 57 completely through a first restriction point (that is, through the restriction openings 55 in the first bottom segment 51). The flow passes through the first sub-chamber 57 in transverse direction, wherein the cold-water flow and/or hot-water flow exits at a second restriction point (formed by the restriction openings 55 in the second bottom segment 49) into the outlet-end second sub-chamber 59.

In FIG. 5, the single-lever cartridge is shown according to a second exemplary embodiment, which is designed to be essentially identical in design to the single-lever cartridge of the preceding figures. In contrast to the previous figures, in FIG. 5 a cleaning unit 61 is disposed in the inlet-end sub-chamber 57, which prevents the clogging of the throttle openings 55 by limescale. The cleaning unit 61 has a baffle plate 63 from which cleaning pins 65 project. The cleaning pins are guided through the throttle openings 55 with hole clearance. In addition, the baffle plate 63 is loosely disposed in the first sub-chamber 57 and, in its rest position (i.e., when the faucet is not actuated), is spaced at a distance Δa (FIG. 5) from a wall 67 of the slide plate 17 delimiting the first sub-chamber 57. When the water is running through the faucet, the baffle plate 63 in conjunction with its cleaning pins 65 is moved in the direction of the slide plate 17, using up the above distance Δa, which prevents the throttle openings 55 from being clogged by limescale.

FIG. 6 shows a further exemplary embodiment of the single-lever cartridge, in which a compression spring 69 is supported between the delimiting wall 67 of the slide plate 17 and an upper end of the retaining flange 47 of the throttle element 41, which is used to secure the retaining flange 47 at the dynamic control disk 8.

LIST OF REFERENCE NUMERALS

1 swivel sleeve
2 cartridge housing
3 swivel lever
5 control disk pack
6 stationary control disk
8 dynamic control disk
11 upper lever arm
13 lower lever arm
15 axis connection
17 slide plate
19 bearing position
25 axle journal
27 hot-water inlet
29 cold-water inlet
31 mixed-water outlet
33 recess
34 mixing chamber
35, 37 sealing surfaces
39 mouths
41 throttling element
43 throttle bottom
45 shell
47 retaining flange
49, 51 bottom segments
53 transition section
55 throttle openings
57, 59 sub-chambers
61 cleaning unit
63 baffle plate
65 cleaning pins
67 delimiting wall
69 spring
D axis of rotation
L bearing axis
K tilting axis
Δa distance
Δx clearance height
DE sealing plane

The invention claimed is:

1. A single-lever cartridge for a sanitary faucet comprising:
   a swivel lever (3) for adjusting temperature and/or quantity of mixed water, and
   a control disk arrangement (5) comprising:
      a stationary control disk (6) disposed in a stationary manner in the single-lever cartridge, and
      a dynamic control disk (8) displaceable by the swivel lever (3),
   wherein the stationary control disk (6) has a cold-water inlet (29), a hot-water inlet (27), and a mixed-water outlet (31) formed therein,
   wherein the dynamic control disk (8) has a recess (33) formed therein,
   wherein the dynamic control disk (8) can be brought into different overlaps with the cold-water inlet (29), the hot-water inlet (27), and the mixed-water outlet (31) to adjust the temperature and/or quantity of mixed water routed from the mixed-water outlet (31) of the stationary control disk (6),
   wherein the stationary control disk (6) has a sealing surface (35) and the dynamic control disk (8) has a sealing surface (37), the stationary control disk (6) and the dynamic control disk (8) being in sliding contact via the sealing surfaces (35, 37) thereof that are facing each other at a sealing plane (DE),
   wherein mouths (39), which the sealing surface (37) of the dynamic control disk (8) of the cold-water inlet (29) and the hot-water inlet (27) can cover, are formed in the sealing surface (35) of the stationary control disk (6),
   wherein the cartridge has a throttle element (41) as a separate component, which can be used to reduce a flow cross section of the mouths (39) of the cold-water inlet (29) and the hot-water inlet (27), for throttling hot-water flow and/or cold-water flow into the recess (33) of the dynamic control disk (8), and wherein the throttle element (41) is cup-shaped, having a throttle bottom (43) and a shell (45) rising therefrom, wherein the throttle bottom (43) has throttle openings (55), which throttle bottom (43), at its bottom end facing the sealing surface (35) of the stationary control disk (6), is flush with the sealing plane (DE) and/or is in sliding contact with the sealing surface (35) of the stationary control disk (6), wherein the control disk arrangement (5) has a slide plate (17) mounted in a stationary manner at the dynamic control disk (8), at which slide plate a bearing position (19) is formed for an axle connection (15) at the swivel lever (3), and in that the shell (45) of the throttle element (41) merges into an outwardly angled retaining flange (47) at its rim remote from the bottom, wherein the retaining flange (47) is secured between the dynamic control disk (8) and the slide plate (17), and in that the retaining flange (47) of the throttle element (41) is pressed against the dynamic control disk (8) by means of a spring (69).

2. The single-lever cartridge according to claim 1, wherein the shell (45) of the throttle element (41) has a closed surface.

3. The single-lever cartridge according to claim 2, wherein the shell (45) is in gap-free contact with an inner wall of the dynamic control disk (8) delimiting the recess (33).

4. The single-lever cartridge according to claim 1, wherein the throttle bottom (43) of the throttle element (41) is divided into a first bottom segment (51) having throttle openings (55), which, at its bottom end facing the sealing surface (35) of the stationary control disk (6), is flush with the sealing plane (DE) and/or is in sliding contact with the sealing surface (35) of the stationary control disk (6), and into a second bottom segment (49) having throttle openings (55), which bottom segment is spaced apart from the sealing plane (DE) by a distance (Δy).

5. The single-lever cartridge according to claim 1, wherein the recess (33) formed in the dynamic control disk (8) forms a mixing chamber (34) in conjunction with the mixed-water outlet (31) in the stationary control disk (6), and in that the throttle element (41) divides the mixing chamber (34) into a first inlet-end sub-chamber (57) and a second outlet-end sub-chamber (59), wherein a cold and/or hot water flow at the inlet end initially flows completely through the first inlet-end sub-chamber (57) and exits into the second outlet-end sub-chamber (59) at the throttle openings (55) of the second bottom segment (49).

6. The single-lever cartridge according to claim 1, wherein the shell (45) is a circumferentially closed shell.

7. A single-lever cartridge for a sanitary faucet comprising:
a swivel lever (3) for adjusting temperature and/or quantity of mixed water, and
a control disk arrangement (5) comprising:
a stationary control disk (6) disposed in a stationary manner in the single-lever cartridge, and
a dynamic control disk (8) displaceable by the swivel lever (3),
wherein the stationary control disk (6) has a cold-water inlet (29), a hot-water inlet (27), and a mixed-water outlet (31) formed therein,
wherein the dynamic control disk (8) has a recess (33) formed therein,
wherein the dynamic control disk (8) can be brought into different overlaps with the cold-water inlet (29), the hot-water inlet (27), and the mixed-water outlet (31) to adjust the temperature and/or quantity of mixed water routed from the mixed-water outlet (31) of the stationary control disk (6), wherein the stationary control disk (6) has a sealing surface (35) and the dynamic control disk (8) has a sealing surface (37), the stationary control disk (6) and the dynamic control disk (8) being in sliding contact via the sealing surfaces (35, 37) thereof that are facing each other at a sealing plane (DE), wherein mouths (39), which the sealing surface (37) of the dynamic control disk (8) of the cold-water inlet (29) and the hot-water inlet (27) can cover, are formed in the sealing surface (35) of the stationary control disk (6), wherein the cartridge has a throttle element (41) as a separate component, which can be used to reduce a flow cross section of the mouths (39) of the cold-water inlet (29) and the hot-water inlet (27), for throttling hot-water flow and/or cold-water flow into the recess (33) of the dynamic control disk (8), wherein the throttle element (41) has a throttle bottom (43) having throttle openings (55), which throttle bottom (43), at its bottom end facing the sealing surface (35) of the stationary control disk (6), is flush with the sealing plane (DE) and/or is in sliding contact with the sealing surface (35) of the stationary control disk (6), wherein the recess (33) formed in the dynamic control disk (8) forms a mixing chamber (34) in conjunction with the mixed-water outlet (31) in the stationary control disk (6), and in that the throttle element (41) divides the mixing chamber (34) into a first inlet-end sub-chamber (57) and a second outlet-end sub-chamber (59), wherein a cold and/or hot water flow at the inlet end initially flows completely through the first inlet-end sub-chamber (57) and exits into the second outlet-end sub-chamber (59) at the throttle openings (55) of the second bottom segment (49), and wherein a cleaning unit (61) is disposed in the first inlet-end sub-chamber (57), which cleaning unit prevents the throttle openings (55) from being clogged by limescale.

8. The single-lever cartridge according to claim 7, wherein the cleaning unit (61) has a baffle plate (63), which is spaced apart from the throttle openings (55), which is disposed loosely in the first inlet-end sub-chamber (57) and from which cleaning pins (65) project, which are guided through the throttle openings (55) with hole clearance, and in that the flow pressure of the cold and/or hot water flowing into the first inlet-end sub-chamber (57) moves the baffle plate (63) in conjunction with the cleaning pins (65) and as a result clogging of the throttle openings (55) by limescale is prevented.

9. A single-lever cartridge for a sanitary faucet comprising:
a swivel lever (3) for adjusting temperature and/or quantity of mixed water, and
a control disk arrangement (5) comprising:
a stationary control disk (6) disposed in a stationary manner in the single-lever cartridge, and
a dynamic control disk (8) displaceable by the swivel lever (3),
wherein the stationary control disk (6) has a cold-water inlet (29), a hot-water inlet (27), and a mixed-water outlet (31) formed therein,
wherein the dynamic control disk (8) has a recess (33) formed therein,
wherein the dynamic control disk (8) can be brought into different overlaps with the cold-water inlet (29), the hot-water inlet (27), and the mixed-water outlet (31) to adjust the temperature and/or quantity of mixed water routed from the mixed-water outlet (31) of the stationary control disk (6), wherein the stationary control disk (6) has a sealing surface (35) and the dynamic control disk (8) has a sealing surface (37), the stationary control disk (6) and the dynamic control disk (8) being in sliding contact via the sealing surfaces (35, 37) thereof that are facing each other at a sealing plane (DE), wherein mouths (39), which the sealing surface (37) of the dynamic control disk (8) of the cold-water inlet (29) and the hot-water inlet (27) can cover, are formed in the sealing surface (35) of the stationary control disk (6), wherein the cartridge has a throttle element (41) as a separate component, which can be used to reduce a flow cross section of the mouths (39) of the cold-water inlet (29) and the hot-water inlet (27), for throttling hot-water flow and/or cold-water flow into the recess (33) of the dynamic control disk (8), and wherein the throttle element (41) has a throttle bottom (43) having throttle openings (55), which throttle bottom (43), at its bottom end facing the sealing surface (35) of the stationary control disk (6), is flush with the sealing plane (DE) and/or is in sliding contact with the sealing surface (35) of the stationary control disk (6), wherein the throttle bottom (43) of the throttle element (41) is divided into a first bottom segment (51) having throttle openings (55), which, at its bottom end facing the sealing surface (35) of the stationary control disk (6), is flush with the sealing plane (DE) and/or is in sliding contact with the sealing surface (35) of the stationary control disk (6), and into a second bottom segment (49) having throttle openings (55), which bottom segment is spaced apart from the sealing plane (DE) by a distance ($\Delta y$), and wherein the two bottom segments (49, 51) merge into one another at a closed-surface transition section (53).

\* \* \* \* \*